US007018033B2

(12) United States Patent
Joppen

(10) Patent No.: US 7,018,033 B2
(45) Date of Patent: Mar. 28, 2006

(54) INKJET PRINTER PROVIDED WITH A DEVICE FOR DISPENSING INK PELLETS

(75) Inventor: Sandor H. G. Joppen, Venlo (NL)

(73) Assignee: Océ Technologies, B.V., Ma Venio (NL)

( * ) Notice: Subject to any disclaimer, the term of this patent is extended or adjusted under 35 U.S.C. 154(b) by 104 days.

(21) Appl. No.: 10/717,509

(22) Filed: Nov. 21, 2003

(65) Prior Publication Data

US 2005/0007428 A1 Jan. 13, 2005

(30) Foreign Application Priority Data

Nov. 27, 2002 (NL) .................................... 1022004

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85
See application file for complete search history.

(56) References Cited

U.S. PATENT DOCUMENTS

| | | | | |
|---|---|---|---|---|
| 3,713,563 | A * | 1/1973 | Dickensheets et al. | 221/205 |
| 4,466,229 | A | 8/1984 | Gino | |
| 4,723,135 | A | 2/1988 | Yano et al. | |
| 6,409,327 | B1 * | 6/2002 | Koeleman et al. | 347/88 |
| 6,440,629 | B1 * | 8/2002 | Zhao et al. | 430/117 |
| 2002/0003563 | A1 * | 1/2002 | Hollands et al. | 347/88 |

FOREIGN PATENT DOCUMENTS

| | | | | |
|---|---|---|---|---|
| EP | 1 101 617 | A2 | | 5/2001 |
| JP | 06143558 | A | * | 5/1994 |
| JP | 06143603 | A | * | 5/1994 |
| JP | 08207306 | A | * | 8/1996 |
| JP | 10217503 | A | * | 8/1998 |
| JP | 11115213 | A | * | 4/1999 |
| JP | 11115216 | A | * | 4/1999 |
| JP | 11179012 | A | * | 7/1999 |

OTHER PUBLICATIONS

Patents Abstracts of Japan, vol. 1999, No. 9, Jul. 30, 1999 & JP 11-115213A (Brother Ind. Ltd.), Apr. 27, 1999.
Patent Abstracts of Japan, vol. 1999, No. 12, Oct. 29, 1999 & JP 11-179012A (Omron Corp), Jul. 6, 1999.

* cited by examiner

*Primary Examiner*—Manish Shah
*Assistant Examiner*—Leonard Liang
(74) *Attorney, Agent, or Firm*—Birch, Stewart, Kolasch & Birch, LLP

(57) ABSTRACT

An inkjet printer provided with a dispensing device for dispensing ink pellets of substantially identical shape, said dispensing device including a duct for transporting the ink pellets from an upstream location to a downstream ink pellet separating unit, a first boundary means causing the ink pellets to form as a single layer in the duct, the layer disposed at a small angle relative to the horizontal plane, and a second boundary means causing the ink pellets form in a single row in the direction of flow in the duct directly preceding the separating unit, the row having a length such that it extends over at least two ink pellets.

15 Claims, 2 Drawing Sheets

INKJET PRINTER PROVIDED WITH A DEVICE FOR DISPENSING INK PELLETS

BACKGROUND OF THE INVENTION

This non-provisional application claims priority under 35 U.S.C. § 119(a) on Patent Application No. 1022004 filed in The Netherlands on Nov. 27, 2002, which is herein incorporated by reference.

1. Field of the Invention

The present invention relates to an inkjet printer provided with a device for dispensing ink pellets of substantially identical shape. The invention also relates to a dispensing device suitable for use in such a printer.

2. Related Art

A printer of this kind is known from EP 1 101 617. The dispensing device in this printer comprises a holder extending vertically to hold round ink pellets. The base of this holder extends to a separating unit for separating the ink pellets one-by-one. This separating unit separates an ink pellet from the supply of ink pellets by making a single separating action. The specific construction of the separating unit is intended to prevent two or more ink pellets from being dispensed simultaneously. However, it is a disadvantage of this known inkjet printer that the separation of the ink pellets is relatively unreliable. Particularly in applications where a high ink demand is required, for example in the printing of full-color posters, this can lead to a situation in which printing must be temporarily interrupted or otherwise print artefacts may form. Another disadvantage of the known dispensing device is that the separating action is accompanied by relatively considerable noise which is a nuisance to the user. A printer of this kind is also known from U.S. Pat. No. 4,723,135. The dispensing device of this printer is even less reliable.

SUMMARY OF THE INVENTION

The object of the present invention is to provide a dispensing device by means of which ink pellets can be separated and dispensed with a very high degree of reliability. To this end, an inkjet printer has been invented wherein the dispensing device comprises a duct for transporting the ink pellets from an upstream location to a downstream, ink pellet separating unit, first boundary means whereby the ink pellets form a single row in the direction of flow in the duct directly preceding the separating unit, the single row having a length such that it extends at least two ink pellets, and a second boundary means which forms the ink pellets into a single layer in the duct directly preceding the single row. The layer of pellets forms a small angle with respect to the horizontal plane.

It has surprisingly been found that using a device of this kind it is possible to obtain an inkjet printer which has a very high separating reliability, typically up to 99.995%. Further investigation has shown that the relatively high unreliability of the known inkjet printers is often not the consequence of deficiencies of the separating unit itself, but of deficiencies in the supply path leading to the separating unit. It has been found that a separating action in which no ink pellet is dispensed is often accompanied by a dammed supply of ink pellets. In other words, in the known dispensing devices a blockage regularly occurs in the supply path. Although such blockages usually disappear by themselves, the temporary obstruction adversely affects the dispensing of the ink pellet at the required time.

In the inkjet printer according to the present invention, the ink pellets are supplied over a path which extends substantially almost horizontally. Since boundary means are provided, there is a guarantee, at least to a significant extent, that the ink pellets extend in a single layer. Consequently substantially no ink pellets lie one upon the other and this has been found to contribute to increasing the reliability of the supply of pellets. The layer of pellets leads into a single row of pellets which is at least two pellets long. As a result, the pellets are thus supplied one-by-one to the separating unit. As a result, the risk of two or more pellets blocking the inlet opening of the separating unit is substantially eliminated. It should be clear that there are many types of boundary means suitable for use in an ink-jet printer according to the present invention. Thus tangible boundary means such as walls or obstacles can be used, but also intangible boundary means can be used, for example, by exerting forces on the pellets, to ensure a particular pellet configuration.

In one embodiment, the angle of the pellet dispensing surface is less than or equal to 20°. It has been found that with such an angle the risk of bridge formation of the ink pellets is greatly reduced. Bridge formation is the phenomenon in which two or more ink pellets form a bridge in the duct, which bridge, because of its configuration, at least temporarily interrupts the transport of the ink pellets. This effect is substantially eliminated with an angle of less than or equal to 20°.

In another embodiment the angle is less than or equal to 12°. With a inclination of 12° or less, it has been found that the single layer has a self-restoring ability. If some ink pellets are found to lie one upon the other in the duct, for any reason whatsoever, for example as a result of a user colliding with the inkjet printer, then with an angle of inclination according to this embodiment the layer will very rapidly become a single layer, leading to increased reliability.

In one embodiment, the single row extends over at least five ink pellets directly preceding the separating unit. It has been found that this provides considerable further improvement in the supply of ink pellets, particularly in printers which have a high ink consumption. The reason for this is not completely clear but probably due to the fact that a row of at least five pellets, and hence the presence of a buffer of at least four individual ink pellets, does not block the supply to the separating unit, even in the event of a temporary interruption of the transport in the duct, because such a buffer is large enough to absorb even a relatively long-lasting interruption in the transport of the ink pellets.

In one embodiment, the second boundary means are such that the single layer gradually becomes narrower in the direction of flow. In this embodiment the transport in the duct starts over a width of a smaller or larger number of ink pellets, whereafter this width gradually decreases finally merging into the single row directly preceding the separating unit. The risk of a blockage of the transport in the dispensing device is thus further reduced.

In a further embodiment, the single layer of pellets has a wedge-shaped configuration. With this embodiment, the width of the layer decreases continuously. As a result of the continuous decrease, there are no dead angles in the transport duct. This greatly reduces the risk of one or more ink pellets remaining in the duct for a longer time than average.

In one embodiment, the duct has a convex bulge directed towards the layer of pellets at the position where the layer extends transversely of the direction of flow over two ink pellets. It has been found that particularly at this location in the duct where the layer, as considered transversely of the transport direction, extends over two ink pellets, there is a relatively considerable risk of blockage of the transport. Apparently, a bridge of two ink pellets can be formed relatively easily between the boundaries of the layer as defined by the boundary means. In addition, a bridge of two ink pellets is relatively strong. It has been found that such a bridge formation can be obviated in this embodiment. Thus, as a result of the convex bulge the ink pellet is forced to move in a direction different from the transport direction at the location of the bulge. In addition, the ink pellet is caused to rotate to a varying degree as a result of this sudden deviating movement caused by the convex bulge. The result is that the risk of a blockage of ink pellets in the surrounding areas of the convex bulge is practically zero.

In one embodiment, directly preceding the upstream location of the transport duct an ink pellet holder is provided for holding the three-dimensional volume of ink pellets. By the presence of a holder of this kind many more ink pellets can be received by the dispensing device. This makes the inkjet printer user-friendly because there is a less frequent a need to replenish the quantity of ink pellets. It is even possible to supply the dispensing device, and hence the duct, holder and optionally the separating unit, as a cartridge and replace it in its entirety when the ink pellets are used up.

In another embodiment, in which both the duct and the holder have a base, and the base of the holder merges into the base of the duct, an opening in the form of a gap is provided in the wall of the holder at the location of the transition from the holders to the duct, the height of the gap being slightly larger than the diameter of the ink pellets. In this embodiment the ink pellets can be transported over the base of the holder to the base of the duct, for example, in the case of round ink pellets, substantially by the action of gravity. The gap at the transition between the holder and the duct is such that a single layer of ink pellets emerges from the holder. In other words, in this embodiment the gap is an important part of the above-mentioned second boundary means.

In one embodiment in which the duct has a base and two sidewalls, the base contains steps. In this embodiment there is no continuous inclined plane, but instead, the inclination is embodied over a small part of the duct whereafter there is suddenly a recess in the duct. The transport then continues over a practically horizontal part with only a slight angle of inclination. In this embodiment the ink pellets fall from each step onto a following part of the duct containing a slight inclination. As a result of this mechanical impact the incidence of bridges is further counteracted and the pellets roll, as it were, continuously from step to step. Good transport of this kind can be achieved even with a pellet which is not round.

In another embodiment, the steps form an angle other than 90° with the direction of flow in the duct. In this embodiment the pellets not only receive a rolling movement in the transport direction when they fall off a step, but they also have a rolling movement in a direction which forms an angle with the transport direction. The transport is further improved as a result.

In a further embodiment, the base of the duct is movable with respect to the side walls. In this embodiment, as a result of the movement of the base with respect to the walls, a force is exerted on particularly those ink pellets which are in contact with both the base and the side wall. In this way it is possible to prevent ink pellets from lodging on the walls.

In another embodiment of the above, the base of the duct hinges with respect to the side walls. This embodiment is advantageous because the dispensing device can then easily be equipped with a separating unit as known from EP 1 101 617. The base of the duct and the holder in this embodiment can move jointly with a separating action of the separating unit. This simplifies the construction of the dispensing device and makes the use of the entire dispensing device, in cartridge form, even simpler.

According to yet another improvement of the above-described embodiment, the hinge point is situated in the surroundings of the upstream location. In this way the influence of the holder filled with ink pellets on the hinging movement is relatively minimal. Because the hinge point is in the neighborhood of the holder, relatively little force will be required to hinge even a full holder. In this way it is possible to dispense with a powerful motor and also less noise is created by the movement of the bases.

It should also be noted that the duct for transporting the ink pellets can also have a variable direction of flow. In other words, the duct can also be curved. This may be advantageous in applications in which a duct extending in just one direction occupies too much room.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
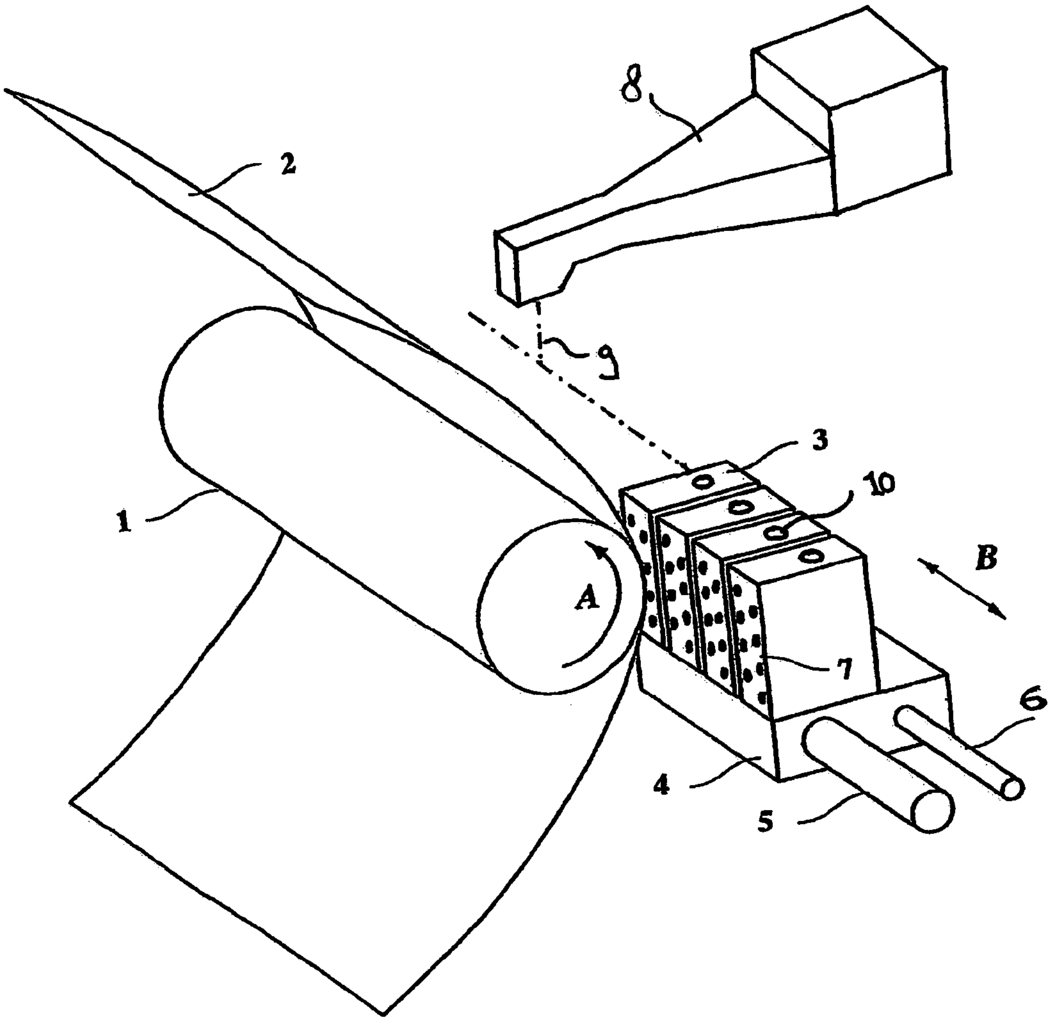
FIG. 1 is a diagram showing an inkjet printer and a dispensing device according to the present invention.

FIG. 1 shows a printer provided with ink ducts. In this embodiment the printer comprises a roller 1 which supports a substrate 2 which is moved along four printheads 3. The roller 1 is rotatable about its axis as indicated by arrow A. A carriage 4 carries the four printheads 3 and can be moved in reciprocation in the direction indicated by the double arrow B, parallel to roller 1. In this way the printheads 3 can scan the receiving substrate 2, for example a sheet of paper. The carriage 4 is guided over rods 5 and 6 and is driven by means (not shown) suitable for this purpose.

In the embodiment as illustrated in the drawing, each printhead contains eight ink ducts, each with its own nozzle 7, which form two rows of four nozzles each perpendicular to the axis of the roller 1. In a practical embodiment of the printer, the number of ink ducts per printhead will be many times greater than shown. Each ink duct is provided with means for energising the ink duct (not shown) and an associated electric actuation circuit (not shown). In this way, the ink duct, the means for energising the ink duct, and the actuation circuit form a unit which functions to eject ink drops in the direction of roller 1. If the ink ducts are energised image-wise, an image forms which is built up from ink drops deposited on the substrate 2.

When a substrate is printed with a printer of this kind in which ink drops are ejected from ink ducts, the substrate, or part thereof, is (imaginarily) divided into fixed locations which form a regular field of pixel rows and pixel columns. In one embodiment, the pixel rows are perpendicular to the pixel columns. The resulting separate locations can each be provided with one or more ink drops. The number of locations per unit of length in the directions parallel to the pixel rows and pixel columns is termed the resolution of the printed image, and is indicated, for example, as 400×600 d.p.i. ("dots per inch"). By image-wise energization of a row of nozzles of the printhead of the printer, when it moves over a strip of the substrate in a direction substantially parallel to the pixel rows, the row of nozzles being substantially parallel to the pixel columns, as shown in FIG. 1, an image built up from ink drops forms on the substrate.

In this embodiment, the printer is provided with a number of dispensing devices 8, one for each color, only one being shown in FIG. 1 for simplification. With a dispensing device of this kind it is possible to dispense ink pellets at each of the printheads. The ink used is a hot melt ink. An ink of this kind is solid at room temperature and liquid at elevated temperatures. This ink is dispensed in solid form to each of the printheads whereafter the ink in the printhead is melted and is brought to operating temperature, typically 130° C. As soon as there is a likelihood of a shortage of liquid ink in one of the printheads, the carriage 4 will be so moved that the relevant printhead is disposed beneath the corresponding dispensing device level at the dispensing line 9. One or more ink pellets will then be dispensed to the printhead, said pellets entering the printhead via opening 10. These pellets are then melted and brought to operating temperature. In this way each printhead can be provided with sufficient ink at all times.

Figure 2:
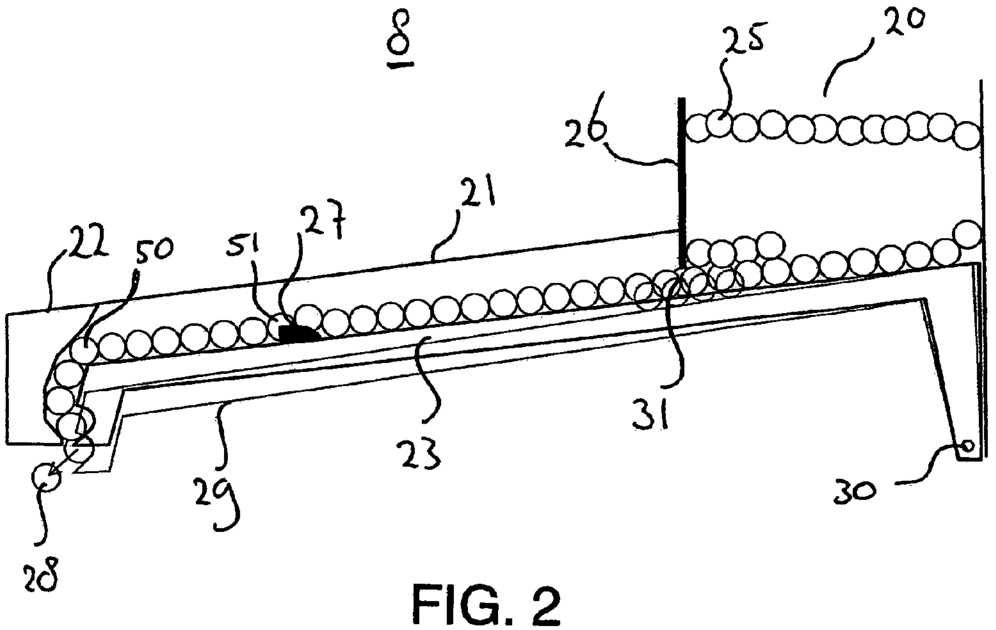
FIG. 2 is a diagram showing a section of the dispensing device according to the present invention.

FIG. 2 is a diagram showing a longitudinal section of a dispensing device 8 including a holder 20 for holding a three-dimensional supply of ink pellets. In addition, the device comprises a transport duct 21 for transporting the ink pellets from the upstream holder 20 to a downstream separating unit 22. Transport duct 21 and holder 20, in this embodiment, have a common base 23. The duct is bounded laterally by two walls (not shown), as is also the holder. The holder 20 contains a stock of ink pellets 25, only the top and bottom pellets being shown in the Figure for simplification. On the side facing the duct 21 the holder is bounded by a partition 26. Between the partition 26 and the base 23 there is provided an opening 31 which is slightly larger than the diameter of the ink pellets. As a result of this boundary system for the holder, only a single layer of ink pellets is passed from the holder to the duct. As a result of the small angle at which the duct is positioned, relative to the horizontal, the ink pellets roll by themselves in the direction of the separating unit. Where the width of the duct is such that the single layer of ink pellets extends transversely of the transport direction over a length equal to the diameter of two ink pellets, a convex bulge 27 is formed. Since the walls of the duct are fairly close together at this point, i.e. they are spaced apart by an amount just larger than the diameter of one ink pellet, the single layer is bounded transversely to the flow direction and the ink pellets flow on as a single row in the direction of the separating unit 22. This row starts with ink pellet 51. The last pellet in this row, which pellet thus directly precedes the separating unit 22, is ink pellet 50. The ink pellets which follow are bounded by the walls of the separating unit and are accordingly no longer situated in the duct as defined in the claims. The separating unit shown is similar to that known from EP 1 101 617. To separate the ink pellet 28, the base 23 is moved down as indicated by broken lines 29. As a result, ink pellet 28 is separated and the sluice of unit 22 again fills with an ink pellet. This type of separating unit is described in detail in the said European patent specification. To move the base, the latter is hinged where it is fixed to the dispensing device by means of pivot 30. Since the pivot is situated beneath the holder 20, relatively little energy is required to move the base and the ink pellets disposed thereon. It should be noted that the base moves with respect to the walls of the duct 21 and the holder 20. As a result of this relative movement with respect to the walls, an extra force occurs in addition to gravity and stimulates the transport of the ink pellets to the separating unit.

It should be noted that in some cases a multiple layer of ink pellets may occur in the duct temporarily and often locally, for example if a powerful mechanical impact is given to the dispensing device (for example because someone collides with the printer of which this device forms part). Since this embodiment makes use of an angle of inclination of less than 12°, the layer rapidly restores itself to a single layer. This has been found to benefit the reliability of the transportation process.

Figure 3:
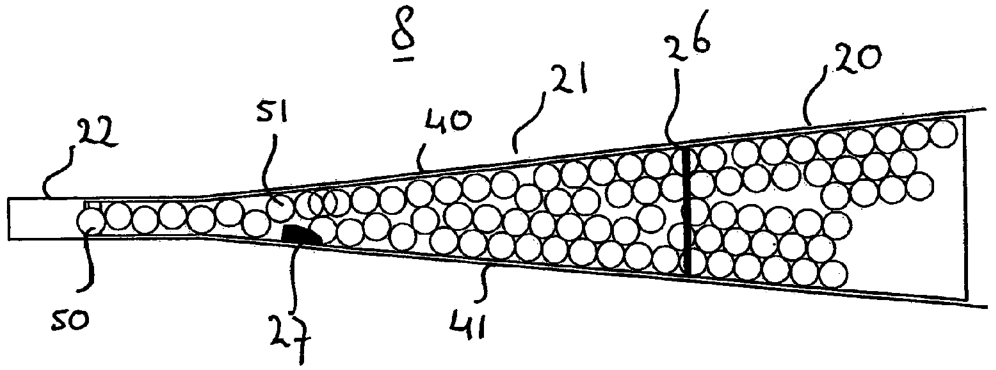
FIG. 3 is a diagrammatic top plan view of the dispensing device of FIG. 2.

FIG. 3 is a top plan view of the dispensing device 8 as shown in FIG. 2. It has been found that the tapering walls 40 and 41 result in a wedge-shaped layer of ink pellets. This reduces the risk of a bridge formation in the duct. As a result of these tapering walls and the bulge 27, the single layer of ink pellets is ultimately bounded in such a manner that it flows on as a single row after the bulge 27. This ensures the supply of individual ink pellets to the separating unit 22 with a very high degree of reliability.

Since the dispensing device can be provided with a relatively large amount of ink pellets, this device can be used as a cartridge. For this purpose, the inkjet printer is provided with means for fixing the dispensing device releasably on a dispensing location of the inkjet printer (fixing means are not shown).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inkjet printer provided with a dispensing device for dispensing ink pellets of substantially identical shape, said dispensing device comprising:

a duct for transporting the ink pellets from an upstream location to a downstream ink pellet separating unit, first boundary means causing the ink pellets to form as a single layer in the duct, said layer having a dimension defined by a plurality of ink pellets extending in at least two directions and being disposed at a small angle relative to the horizontal plane, and second boundary means causing the ink pellets to form in a single row in the direction of flow in the duct directly preceding the separating unit, said row having a length such that it extends over at least two ink pellets.

2. The inkjet printer according to claim 1, wherein the angle is less than or equal to 20°.

3. The inkjet printer according to claim 1, wherein the angle is less than or equal to 12°.

4. The inkjet printer according to claim 1, wherein the row extends over at least five ink pellets.

5. The inkjet printer according to claim 1, wherein the first boundary means causes the single layer to gradually become narrower in the direction of flow.

6. The inkjet printer according to claim 5, wherein the layer has a wedge-shaped configuration.

7. The inkjet printer according to claim 1, wherein the duct has a convex bulge directed towards the said layer at the place where the layer, in the transverse direction of flow, extends over two ink pellets.

8. The inkjet printer according to claim 1, wherein a holder, suitable for holding a three-dimensional volume of ink pellets, is disposed above and communicates with the upstream portion of the transporting duct.

9. The inkjet printer according to claim 8, wherein both the duct and the holder have a base and the base of the holder merges into the base of the duct, wherein an opening in the form of a gap is provided in a wall of the holder at the location of transition from the holder to the duct, the height of the gap being slightly larger than the diameter of the ink pellets.

10. The inkjet printer according to claim 1, wherein the duct has a base and two side walls, said base containing one or more steps.

11. The inkjet printer according to claim 10, wherein the steps form an angle other than 90° with the direction of flow in the duct.

12. The inkjet printer according to claim 1, wherein the duct has a base and two side walls, and the base of the duct is movable with respect to the side walls.

13. The inkjet printer according to claim 12, wherein the base of the duct hinges with respect to the side walls.

14. The inkjet printer according to claim 13, wherein the hinge point is situated in the upstream location.

15. A dispensing device for dispensing ink pellets of substantially identical shape which comprises:

a duct for transporting the ink pellets from an upstream location to a downstream ink pellet separating unit, first boundary means causing the ink pellets to form as a single layer in the duct, said layer having a dimension defined by a plurality of ink pellets extending in at least two directions and being disposed at a small angle relative to the horizontal plane, and second boundary means causing the ink pellets to form in a single row in the direction of flow in the duct directly preceding the separating unit, said row having a length such that it extends over at least two ink pellets.

* * * * *